Figure 1:
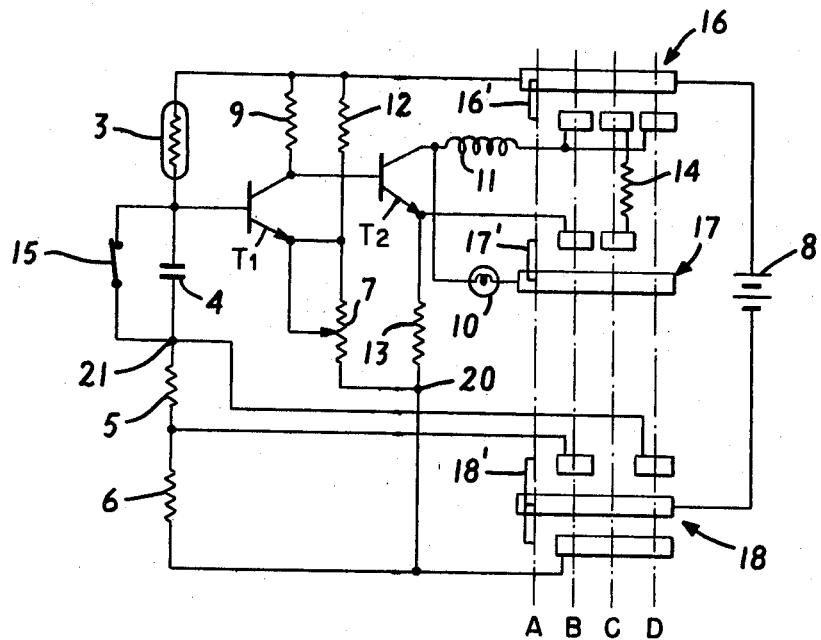

United States Patent
Kitai

[15] 3,678,821
[45] July 25, 1972

[54] WARNING DEVICE FOR AN ELECTRONICALLY CONTROLLED CAMERA SHUTTER

[72] Inventor: Kiyoshi Kitai, Tokyo, Japan
[73] Assignee: Kabushiki Kaisha Hattori Tokeiten, Tokyo, Japan
[22] Filed: April 13, 1970
[21] Appl. No.: 27,819

[52] U.S. Cl. ...................... 95/10 CE, 95/10 CT
[51] Int. Cl. ........................ G03n 17/20, G03n 9/62
[58] Field of Search ............ 95/10 C, 10 CT, 10 CE, 53 EB, 95/53 EA

[56] References Cited

UNITED STATES PATENTS

| | | |
|---|---|---|
| 3,460,450 | 8/1969 | Ogihara ........................ 95/10 CT |
| 3,429,244 | 2/1969 | Wasielewski ................. 95/10 CT |
| 3,502,011 | 3/1970 | Rentschler et al. ........... 95/10 CT |
| 3,397,629 | 8/1968 | Mori et al. .................... 95/10 CT |
| 3,547,548 | 12/1970 | Reich ............................ 95/10 CE |
| 3,618,489 | 11/1971 | Akiyama ....................... 95/53 EB |

Primary Examiner—Samuel S. Matthews
Assistant Examiner—Russell E. Adams, Jr.
Attorney—Robert E. Burns and Emmanuel J. Lobato

[57] ABSTRACT

A warning device is provided for use with a camera having a variably settable iris aperture and an electronically controlled shutter mechanism. The warning device provides a warning signal indicative of either an overexposure or underexposure condition for each particular iris aperture setting. The warning device comprises a warning lamp which is sequentially placed in a plurality of different electric circuits in response to the movement of a sequential switching mechanism. The movement of the sequential switching mechanism is coordinated with the movement of the release lever of the camera shutter mechanism so that an indication of either an overexposure or underexposure condition is given prior to the actuation of the release lever.

11 Claims, 2 Drawing Figures

WARNING DEVICE FOR AN ELECTRONICALLY CONTROLLED CAMERA SHUTTER

The present invention relates to a warning device for visually indicating overexposure and underexposure conditions of an electronically controlled camera shutter.

Warning devices for electronically controlled camera shutters are generally known in the art. In such cameras, a particular iris aperture is manually selected and an electronic delay circuit is employed to control the exposure time in accordance with both the brightness of the object being photographed and the particular film sensitivity. Such electronic delay circuits generally include a photoresistor whose ohmic resistance varies in accordance with the intensity of light incident thereon and this property is used to control the exposure time.

Warning devices are known for this type camera wherein a visual indication is provided in the event the proper exposure time needed for the particular iris aperture selected is so long as to create a substantial risk that the camera would be manually vibrated during the exposure of the film. Similarly, if the object being photographed is too bright for the particular iris aperture selected, an overexposure of the film would occur and warning devices have been provided to indicate this condition.

The prior art warning devices generally comprise a first transistor which actuates a warning device when an overexposure condition exists and a second transistor that actuates the warning device if an underexposure or risk of manual vibration exists. These prior art devices have the disadvantage that separate electric circuits are required to indicate the various conditions and hence a large number of parts is required. The relatively large number of parts results in an increased cost of manufacturing as well as taking up a relatively large space within the camera.

According to the present invention, the above-mentioned disadvantages are overcome by providing a transistor and warning lamp which are sequentially placed in a plurality of different normally open electric circuits in response to the movement of the camera shutter release lever. The movement of the release lever actuates a sequence switch through a plurality of different closed positions thus sequentially closing the plurality of normally open electric circuits prior to the opening of the camera shutter whereby a visual indication indicative of either overexposure or underexposure of the film is provided.

Figure 2:
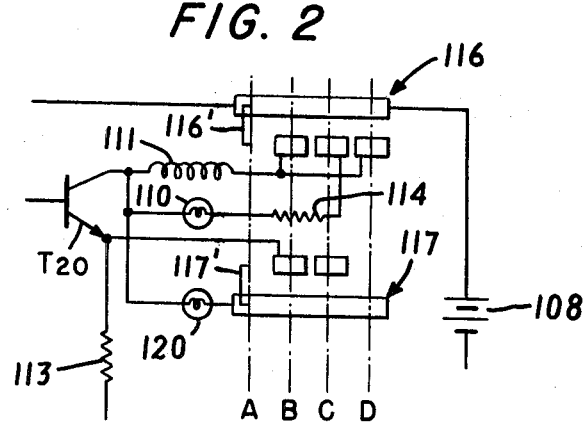

Other features and advantages of the alarm device in accordance with the present invention will be better understood as described in the following specification and appended claims, when taken in conjunction with the following drawings in which:

FIG. 1 is a schematic view of an electric circuit showing one embodiment of the present invention, and FIG. 2 is a schematic view showing a portion of an electric circuit of another embodiment of the present invention.

FIG. 1 shows one embodiment of an electric circuit according to the present invention. A pair of NPN transistors T1 and T2 are connected such that the collector of the transistor T1 is connected to the base of the transistor T2. A photoresistor 3 whose resistance varies inversely with the intensity of light impinging thereon is connected to the base of the transistor T1. A capacitor 4 is also connected to the base of the transistor T1 and is serially connected to a pair of fixed resistors 5, 6 which are connected to stationary contacts of a sequential switching mechanism 16–18 described hereinafter. The emitter of the transistor T1 is connected to a variable resistor 7 whose ohmic resistance varies in proportion to the opening setting of the iris aperture. A d-c voltage source 8 has its positive terminal connected to the collector of the transistor T1 through a fixed resistor 9. The negative terminal of the d-c voltage source is connected to the switching mechanism.

A warning or alarm lamp 10 is connected to the collector of the transistor T2 and is also connected to the sequence switching mechanism, as shown in FIG. 1. Connected to another contact of the switching mechanism is a magnetic coil 11 which is operative to maintain the camera shutter in its open position as long as the coil is energized. The magnetic coil 11 cooperates with a magnet, not shown, to magnetically hold the shutter in the open position when current flows through the magnetic coil after the shutter is opened in response to actuation of the release lever. The magnetic coil 11 is also connected to the collector of the transistor T2 as well as being connected to the warning lamp 10. A fixed resistor 12 is interposed between the positive terminal of the voltage source 8 and the variable resistor 7 and another fixed resistor 13 is connected between the emitter of the transistor T2 and the sequential switching mechanism.

The sequential switching mechanism comprises a plurality of slide switches 16, 17, 18 which are connected in the electric circuit as shown in FIG. 1. Each slide switch comprises an elongated, stationary contact in constant electrical contact with a slider 16′, 17′, 18′. The three sliders or moving contacts are mechanically connected together and are sequentially movable from an initial, non-working position A to a plurality of working positions B, C, D. The moving contacts 16′, 17′, 18′ are sequentially slid along their respective elongated contacts in accordance with the movement of the camera release lever as it is moved to its shutter opening position. It should be noted that the moving contacts are moved through both working positions B and C and occupy the working position D prior to the opening of the camera shutter, or, prior to the release lever reaching its shutter actuating position. As the moving contacts are sequentially shifted, they cooperate with other fixed contacts to sequentially form a plurality of different electrical circuits to selectively cause lighting of the lamp 11 to provide a visual indication to the camera operator of both an overexposure or underexposure condition. A current limiting resistor 14 and a normally closed timing switch 15 are included in the circuit as shown and their function will be described hereinafter.

In operation, the iris aperture is preset for the desired opening. The shutter mechanism is cocked or charged and the sequential switching mechanism assumes the position shown in FIG. 1. In this position, the timing switch 15 is in its normally closed position forming a shunt around the capacitor 4. The camera operator then manually actuates the release lever and as the release lever is moved to effect an opening of the shutter, the moving contacts of the sequential switching mechanism are moved from their non-working position A to the first working position B. Working position B provides an indication of a possible overexposure condition and the warning lamp 10 will become lit if the object being photographed is too bright for the particular setting of the iris aperture. When the sequential switching mechanism is in working position B and assuming that the object being photographed is properly illuminated for the preset iris aperture setting, the photoresistor 3 will have a relatively high resistance and therefore the voltage applied to the base of the transistor T1 will be insufficient to turn this transistor ON. The resistance value of the resistor 5 is so chosen that it cooperates with the particular resistance value of the photoresistor 3 to apply a voltage to the base of the transistor T1 sufficient to render the transistor conductive whenever the brightness of the object being photographed would cause an overexposure for the particular iris aperture selected.

The resistance value of the fixed resistor 9 is selected such that when the transistor T1 is OFF, a sufficient voltage is applied to the base of the transistor T2 to turn this transistor ON whereby a collector current flows from the positive terminal of the d-c voltage source 8, through the slide switch 16, through the magnetic coil 11 and through the collector-emitter path of the transistor T2 to the negative terminal of the voltage source 8 through the resistor 13 and the slide switch 18. In this condition the voltage drop across the collector and emitter of the transistor T2 when the transistor is conducting is decreased to such a level that substantially all the current flows through the transistor T2 and the warning lamp 10 is not lighted.

If an overexposure condition exists, the resistance of the photoresistor 3 accordingly decreases due to the excessive brightness of the object being photographed whereupon the voltage applied to the base of the transistor T1 is sufficient to turn this transistor ON and as the collector-emitter current flows through the transistor T1, the transistor T2 is immediately turned OFF. In other words, when the transistor T1 is conducting, the base voltage of the transistor T2 is lowered to reduce the collector current flow through the transistor T2. When the transistor T2 is turned OFF, the collector-emitter path of the transistor T2 presents a high impedance causing current to flow through the warning lamp 10 whereupon the lamp is lighted thereby providing a visual indication to the camera operator of an overexposure condition.

As the camera release lever is further moved towards the shutter opening position, the sequential switching mechanism is moved to the working position C whereupon an electric circuit is formed for providing an alarm indicative of an underexposure condition. This circuit differs from the above circuit which indicated excess exposure in that in this particular circuit, the magnetic coil 11 is not connected in the circuit whereas the fixed resistor 6 is electrically connected in the circuit. In this underexposure circuit, the warning lamp 10 is connected in series with the collector-emitter path of the transistor T2 through a current limiting resistor 14. The base voltage of the transistor T1 in this circuit is determined by the resistance values of the photoresistor 3 and the resistance values of both the fixed resistors 5 and 6. The resistance value of the resistor 6 is chosen such that when the exposure time becomes too long due to an insufficient brightness of the object being photographed, a voltage less than that required for turning the transistor T1 ON is supplied to the base of the transistor T1. In other words, the resistors 5 and 6 cooperate with the relatively high impedance value of the photoresistor 3 when the brightness of the object being photographed is too low for the particular iris setting to keep the transistor T1 turned OFF. In this position of the sequential switching mechanism, when the transistor T1 is nonconductive, the transistor T2 is immediately turned ON. As aforementioned, when the transistor T1 is turned OFF, a sufficient voltage is applied to the base of the transistor T2 to turn this transistor ON and current then flows from the voltage source 8 through the slide switch 16, the limiting resistor 14, the slide switch 17 through the warning lamp 7 and through the collector-emitter path of the transistor T2 to the negative terminal of the voltage source 8 through the slide switch 18. Thus, when the brightness of the object is too low, the warning lamp 10 is lighted indicating to the camera operator that there is a risk of manually vibrating the camera due to the long exposure time required.

If the object being photographed is sufficiently illuminated, the resistance of the photoresistor 3 would be decreased to such an extent that a sufficient base voltage would be applied to the base of the transistor T1 to render this transistor conductive. When the transistor T1 is turned ON, the transistor T2 is immediately turned OFF thereby terminating the flow of current through the warning lamp 10 and hence no indication is given to the camera operator of a possible vibration danger since the object being photographed has an adequate brightness for the particular iris aperture setting.

The current limiting resistor 14 is used to greatly vary the amount of current flowing through the lamp 10 in the working position C as compared to the current flow through the lamp 10 in the working position B. Hence, the warning lamp 10 will be illuminated at two distinct and easily discernible brightness levels whereupon the camera operator will be easily able to tell whether an overexposure or underexposure-manual vibration danger exists. The limiting resistor 14 thus alters the brightness of the warning lamp 10 so that the particular danger involved may be easily discriminated.

Alternatively, colored filters could be sequentially placed over the warning lamp 10 as the sequential switching mechanism is shifted through its various working positions. For example, a red filter could be moved over the warning lamp 10 when the sequential switching mechanism is in the working position B and a yellow filter could be moved into position over the warning lamp 10 when the substantial switching mechanism is moved to the working position C. The movement of the two filters would be synchronized with the movement of the release lever in the same manner as is the sequential switching mechanism.

As the release lever is further moved in the shutter opening direction, the sequential switching mechanism is finally moved to the working position D which corresponds to the instant in which the shutter mechanism is set in motion to effect opening of the camera shutter. Simultaneously with the movement of the sequential switching mechanism to the working position D, the normally closed timing switch 15 is automatically opened to effect an automatic exposure time control of the camera as discussed below. When the sequential switching mechanism is in the working position D, the fixed resistors 5 and 6, the limiting resistor 14 and the warning lamp 10 are disconnected from the circuit. The magnetic coil 11 is interconnected between the positive terminal of the d-c voltage source 8 and the collector of the transistor T2 whereas the connecting point 21 of the capacitor 4 and the fixed resistor 13 and the variable resistor 7 are connected to the negative terminal of the d-c voltage source.

The working position D corresponds to the more or less conventional electronic exposure time control circuit. With the timing switch 15 closed, the fixed resistors 5, 6 are effectively shunted through the slide switch 18 and substantially all the current flows through the timing switch 15 so that the transistor T1 remains OFF. The resistance offered by the transistor T1 is too high in comparison to the short circuit path existing through the slide switch 18 and insufficient current flows to the base of the transistor T1 to render the transistor conductive. When the transistor T1 is OFF, a suitable voltage is applied through the fixed resistor 9 to the base of the other transistor T2 to turn this transistor ON and current flows through the magnetic coil 11 and the collector-emitter of the transistor T2 thereby energizing the magnetic coil to hold the shutter open when the same is moved to its open position.

Simultaneously with the initial opening of the shutter mechanism, the normally closed timing switch 15 is opened and the capacitor 4 is charged through the photoresistor 3 to a voltage level proportional to the light which is incident upon the photoresistor 3. As the capacitor 4 is charged, the base voltage of the transistor T1 rises until the transistor T1 is turned ON and as soon as the transistor T1 is conductive, the transistor T2 is immediately turned OFF. As soon as the transistor T2 is turned OFF, current ceases to flow through the magnetic coil 11 whereupon the shutter mechanism is rapidly closed thus terminating the exposure time.

FIG. 2 shows another embodiment of the present invention wherein two warning or alarm lamps 110, 120 are used to visually indicate underexposure and overexposure conditions, respectively. The remaining portion of the electric circuit not shown in FIG. 2 is identical to the electric circuit depicted in FIG. 1 and both circuits function in the same manner except as hereinafter pointed out.

As shown in FIG. 2, the warning lamp 120 is connected to a slide switch 117 and is placed across a source of d-c voltage 108 when the moving contact 117' is moved into the working position B. The operation of this embodiment of the invention is substantially the same as that of the embodiment disclosed in FIG. 1. When the sequential switching mechanism is moved to the working position B, the transistor T20 will be turned OFF if the brightness of the object being photographed is too intense for the particular iris aperture setting. When the transistor T20 is turned OFF, current flows through the slide switch 116, the magnetic coil 111, the warning lamp 120, the slide switch 117 and the fixed resistor 113 whereupon the warning lamp is lighted and a visual indication of an overexposure condition is provided.

When the sequential switching mechanism is moved to the working position C, current will flow through the fixed resistor 114 and the warning lamp 110 thereby lighting this lamp only when the transistor T20 is turned ON. As aforementioned with reference to FIG. 1, the transistor T20 is turned ON and rendered conductive when the sequential switching mechanism is in the working position C only when the brightness of the object being photographed is insufficient to reduce the resistance of the photoresistor 3 to the level required to turn the transistor T1 ON. When the sequential switching mechanism is in the working position B, the warning lamp 120 will light when the transistor T20 is turned OFF whereas when the sequential switching mechanism is in the working position C, the warning lamp 110 will light when the transistor T20 is turned ON.

The Warning device of the present invention thus provides a warning signal indicative of either an overexposure or an underexposure condition as a function of each particular iris aperture setting. The variable resistor 7 provides an ohmic resistance proportional to the iris opening and this resistance value in conjunction with the other circuit elements determines when the transistor T2 or T20 will be turned ON and OFF. The various working positions of the sequential switching mechanism operate to close a plurality of normally open electric circuits to provide an overexposure test, an underexposure test, and an automatic exposure control for each iris aperture setting. The warning device according to the present invention provides all the functions of the prior art devices but requires a lesser number of parts. This results in reduced manufacturing costs as well as considerable savings in both labor and spatial requirements.

What I claim and desire to secure by Letters Patent is:

1. A warning device for use with a camera having a variably settable iris aperture and an electronically controlled shutter movable from a normally closed position to an open position and back to said closed position defining an exposure time, said warning device comprising: first normally open electric circuit means including a plurality of connected together electrical elements operable when closed for providing a warning signal indicative of an overexposure condition as a function of a particular iris aperture setting; second normally open electric circuit means including some of said electrically connected together elements in said first electric circuit means operable when closed for providing a warning signal indicative of an underexposure condition as a function of said iris aperture setting; switching means movable to at least first and second working positions to sequentially close respectively said first and second normally open electric circuit means prior to any opening movement of a camera shutter; and wherein said first and second normally open electric circuit means include a common transistor operable in both a conducting mode and nonconducting mode, signal means operative when said transistor is in said nonconducting mode for providing a warning signal indicative of said overexposure condition and operative when said transistor is in said conducting mode for providing a warning signal indicative of said underexposure condition, and means responsive to said overexposure condition for effecting operation of said transistor in said nonconducting mode when said switching means is in said first working position and responsive to said underexposure condition for effecting operation of said transistor in said conducting mode when said switching means is in said second working position whereby a warning signal indicative of either an overexposure or underexposure condition is provided before an exposure is made.

2. A warning device according to claim 1, wherein said switching means is movable to a third working position; and further comprising an electronic delay circuit including some of said electrically connected together elements in said first and second electric circuit means operative to automatically control the exposure time of a camera shutter in accordance with the brightness of an object being photographed when said switching means is in said third working position.

3. A warning device according to claim 2, wherein said switching means comprises a plurality of slide switches, each said slide switch comprising a series of stationary electrical contacts each connected to particular ones of said electrical elements and a movable contact sequentially slidable to said first, second and third working positions to electrically interconnect preselected ones of said stationary contacts.

4. A warning device according to claim 1, wherein said signal means comprises a first warning lamp connected to said transistor energizable only when said switching means is in said first working position to provide a warning signal indicative of said overexposure condition, and a second warning lamp connected to said transistor energizable only when said switching means is in said second working position to provide a warning signal indicative of said underexposure condition.

5. A warning device according to claim 1, wherein said signal means comprises a warning lamp electrically connected in parallel with said transistor when said switching means is in said first working position and in series with said transistor when said switching means is in said second working position.

6. In a camera having a variably settable iris aperture and an electronically controlled shutter movable from a closed position to an open position and back to said closed position defining an exposure time, a warning device for providing a warning signal indicative of either an overexposure or underexposure condition comprising: a transistor operable in a conducting mode and a nonconducting mode; first normally open electric circuit means connected to said transistor operable when closed for placing said transistor in one of said conducting and nonconducting modes and providing a first warning signal indicative of an overexposure condition as a function of a particular iris aperture setting when an overexposure condition exists; second normally open electric means connected to said transistor operable when closed for placing said transistor in the other of said conducting and nonconducting modes and providing a second warning signal indicative of an underexposure condition as a function of said iris aperture setting when an underexposure condition exists; and switching means sequentially movable to at least a first working position to temporarily close and then open said first normally open electric circuit means and a second working position to temporarily close and then open said second normally open electric circuit means both prior to any opening movement of said shutter; whereby a warning signal indicative of either an overexposure or underexposure condition is provided before an exposure is made.

7. A camera according to claim 6, wherein said first normally open electric circuit includes means for placing said transistor in said nonconducting mode when an overexposure condition exists.

8. A camera according to claim 7, wherein said switching means is movable to a third working position; and further including an open electronic delay circuit closeable by said switching means when same is in said third working position for automatically controlling the exposure time of said shutter in accordance with the brightness of an object being photographed.

9. A camera according to claim 8, wherein said switching means comprises a first series of contacts connected in said first normally open electric circuit means, a second series of stationary contacts connected in said second normally open electric circuit means, a third series of stationary contacts connected in said electronic delay circuit, and a movable contact sequentially slidable to said first, second and third working positions to respectively close said first normally open electric circuit means, second normally open electric circuit means and open electronic delay circuit.

10. A camera according to claim 6, wherein said first normally open electric circuit means includes a first warning lamp connected to said transistor energizable only when said switching means is in said first working position to provide said first warning signal; and wherein said second normally open electric circuit means includes a second warning lamp connected to said transistor energizable only when said switching means is in said second working position to provide said second warning signal.

11. A camera according to claim 6, wherein said first and second normally open electric circuit means include a common warning lamp connected in parallel with said transistor and energizable when said switching means is in said first working position to provide said first warning signal and connected in series with said transistor and energizable when said switching means is in said second working position to provide said second warning signal; and wherein said second normally open electric circuit means includes means for changing the luminous output of said warning lamp to cause said second warning signal to have a discernibly different luminous output than said first warning signal.

* * * * *